(12) United States Patent
Mayo et al.

(10) Patent No.: US 6,571,111 B1
(45) Date of Patent: May 27, 2003

(54) METHOD AND APPARATUS FOR REDUCING BATTERY POWER CONSUMPTION OF TRANSCEIVERS IN A COMMUNICATIONS NETWORK USING AN EXTERNAL GENERATED TIMING SIGNAL

(75) Inventors: Robert Nelson Mayo, Mountain View, CA (US); William Riis Hamburgen, Palo Alto, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/129,281

(22) Filed: Aug. 5, 1998

(51) Int. Cl.[7] ................................................ H04B 1/38
(52) U.S. Cl. ...................... 455/574; 455/343; 455/68; 340/7.33
(58) Field of Search .................... 455/343, 574, 455/38.3, 502, 68, 38.2, 39, 572, 550, 334; 340/825.44, 855.8, 7.32, 7.33; 342/357.12

(56) References Cited

U.S. PATENT DOCUMENTS

| | | | | |
|---|---|---|---|---|
| 4,449,248 A | * | 5/1984 | Leslie et al. ................ | 340/7.36 |
| 4,914,649 A | * | 4/1990 | Schwendeman et al. .... | 455/455 |
| 5,124,698 A | * | 6/1992 | Mustonen ............... | 340/825.44 |
| 5,128,938 A | * | 7/1992 | Borras ........................ | 370/311 |
| 5,192,947 A | * | 3/1993 | Neustein ................ | 340/825.44 |
| 5,206,855 A | | 4/1993 | Schwendeman et al. | |
| 5,241,542 A | * | 8/1993 | Natarajan et al. ........... | 370/311 |
| 5,309,153 A | * | 5/1994 | Gaskill et al. ............. | 340/7.33 |
| 5,361,397 A | * | 11/1994 | Wright ...................... | 455/38.2 |
| 5,475,717 A | * | 12/1995 | Cordonnier et al. ........ | 375/356 |
| 5,542,117 A | * | 7/1996 | Hendricks et al. .......... | 455/343 |
| 5,592,173 A | * | 1/1997 | Lau et al. .............. | 342/357.12 |
| 5,627,528 A | * | 5/1997 | Kuznicki .................... | 455/343 |
| 5,740,366 A | * | 4/1998 | Mahany et al. ............. | 709/227 |
| 5,790,113 A | * | 8/1998 | Perlman et al. ............. | 345/213 |
| 5,809,426 A | * | 9/1998 | Randojevic et al. ........ | 455/502 |
| 5,812,617 A | * | 9/1998 | Heckman et al. ........... | 375/362 |
| 5,859,595 A | * | 1/1999 | Yost ...................... | 340/825.44 |
| 5,881,055 A | * | 3/1999 | Kondo ........................ | 370/311 |
| 5,926,394 A | * | 7/1999 | Nguyen et al. ................. | 716/1 |
| 6,115,647 A | * | 9/2000 | Carli et al. .................. | 700/194 |
| 6,307,840 B1 | * | 10/2001 | Wheatley, III et al. ..... | 370/252 |

* cited by examiner

Primary Examiner—Nay Maung
Assistant Examiner—Sonny Trinh
(74) Attorney, Agent, or Firm—Oppenheimer, Wolff & Donnelley, LLP; Leah Sherry

(57) ABSTRACT

In a compunctions network of low power devices, power consumption of the devices is reduced by periodically receiving a timing signal in each device from a transmitter external to the network. A real-time clock in each of the devices is synchronized to the periodically received timing signal to determine a synchronized timing interval. Transmitting and receiving of data between the devices is initiated during an awake period of the synchronized timing interval. Power consumption is reduced in each of the devices during a sleep period of the synchronized timing interval, the sleep period being significantly longer than the awake period.

16 Claims, 4 Drawing Sheets

METHOD AND APPARATUS FOR REDUCING BATTERY POWER CONSUMPTION OF TRANSCEIVERS IN A COMMUNICATIONS NETWORK USING AN EXTERNAL GENERATED TIMING SIGNAL

FIELD OF THE INVENTION

This invention relates generally to communications networks, and more particularly to decreasing power consumption of nodes of the network that have a limited capacity power source.

BACKGROUND OF THE INVENTION

Communications devices, such as pagers, cellular telephones, and personal digital assistants (PDAs), generally "nodes," can increase their useful life by reducing power consumption when the devices are not in use. Power reduction is particularly important now that portable devices are coming into common use. Limited capacity power sources can include batteries, solar cells, thermocouples, piezo crystals, miniature turbines, and the like.

For example, a node is in a "sleep" mode with minimal power consumption until the node actually needs to receive or transmit data in an "awake" mode. One prior art power saving protocol is standardized in the IEEE 802.11 specification.

It would be desirable that the nodes in the network agree on a sleep period and an awake period, and defer all power consuming activities until the awake period. As an example of how this might work, each node is in sleep mode the first 98% of each interval, and checks for communications during the last 2% of each interval. If data need to be communicated, then the devices can extend their awake period until all data are transmitted and received. Of course, this agreement requires the synchronization in time of all nodes in the network.

Prior art approaches have usually generated the required time synchronization signal in the network itself. Often, one node of the network, a "synchronization" node sometimes called an access point, broadcasts a timing signal at regular intervals. The timing signal can be used by all the other nodes to synchronize to the access point, and hence to each other. This scheme is quite feasible when the access point is a high-power transmitter not necessarily concerned about reducing power consumption.

Unfortunately, the broadcast of a regular time signal presents problems for low-power and ad-hoc networks. Ad-hoc refers to networks with mobile nodes that do not rely on a stationary or ever-present infrastructure, for example, a network where all nodes are powered by limited capacity power sources, and the topology of the network is indeterminate and without central management. For example, personal digital assistants (PDA) having functionality equivalent or better than personal computers of the not so distant past are coming into common use. If the PDAs could be configured as loosely coupled networks for data interchange, then their utility would be increased.

As a first problem, the broadcasting of a timing signal at regular intervals must continue even when the network has no data to interchange, needlessly drawing power in the node responsible for generating the timing signal. Second, the network must agree on which node will broadcast the time signal. In ad-hoc networks, with no infrastructure, where mobile nodes can enter and leave at will, maintaining a timing signal by negotiation is a high-power activity that has to happen whenever a node moves, even when there are no data to interchange.

Therefore, it is desired that the synchronization of nodes in a network can be accomplished without having a particular node of the network be designated as synchronization node. In addition, synchronization of all network nodes should be possible without centralized management. If nodes can be synchronized without using network resources, then the consumption of power can be reduced for all nodes.

SUMMARY OF THE INVENTION

The invention provides means and a method for reducing power consumption in a communications network including a plurality of limited power capacity devices such as personal digital assistants. Each device periodically receives a timing signal from a transmitter external to the network. A real-time clock in each device is synchronized to the periodically received timing signal. The real-time clock determining a basic synchronized timing interval.

The transmitting and receiving of data between the devices is initiated during an awake period of the synchronized timing interval, and power consumption is reduced during a sleep period. The awake and sleep periods are synchronized to the basic timing interval. In order to minimize power consumption, the sleep period is significantly longer than the awake period.

BRIEF DESCRIPTION OF THE DRAWINGS

The features of the invention which are believed to be novel are set forth with particularity in the appended claims. The invention itself, together with its objects and advantages thereof, may best be understood by reference to the following description when taken in conjunction with the accompanying drawings in the several figures of which like references numerals identify identical items, in which:

DETAILED DESCRIPTION OF PREFERRED EMBODIMENT

Figure 1:
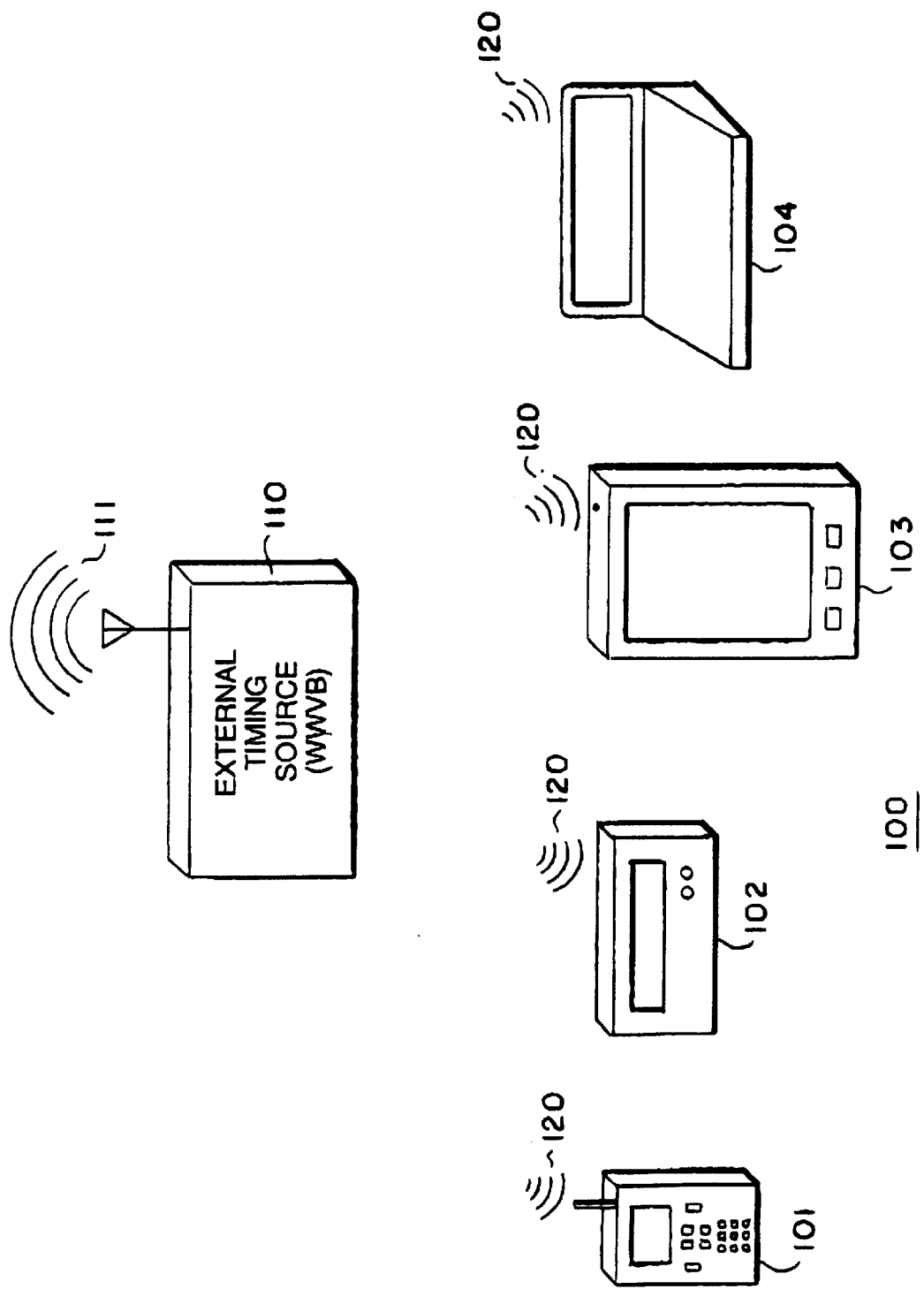
FIG. 1 is a block diagram of a network of devices that use the invention.

FIG. 1 shows a loosely coupled wireless network 100 that includes components and that operate according to the present invention.

The network 100 includes a plurality of devices or "nodes" 101–104. The nodes are operated by limited capacity power sources. For example, node 101 is a transceiver such as cellular telephone. The device 101 can include means for storing data that are received from and transmitted to other nodes of the network 100. Node 102 is a pager that can receive and store data. Nodes 103 and 104 are hand-held digital device that can receive, store, process, and transmit data. One object of the invention is to allow the devices 101–104 to communicate with each other while minimizing power consumption. The communications signals which "connect" the devices 101–104 in the wireless network 100 are generally indicated by reference numeral 120.

As will be described in greater detail below, a source 110 external to the network 100 generates a timing signal 111.

The external timing signal 111 is used to synchronize the internal operation of the network 100. The source 110 is external to the network 100 in the sense that no network resources are used to power the source, and the network has no control over how the timing signal is generated.

The source 110 can be a continental time signal such as produced by the WWVB radio transmitters. Alternatively, the source can use a satellite based timing signal such as produced by the Global Positioning System (GPS). The timing signal can also be obtained from extant signals in an urban area, such as pager channels, television signals, or the 50 or 60 Hz hum from an alternating current electrical power grids. Any external event or signal may be used, as long as it is frequent and detectable by all nodes using a small amount of power. The timing signal 111 contributes to the received communications signals 120 at the nodes 101–104. In other words, the nodes 101–104 "snoop" on the external timing reference.

Figure 2:
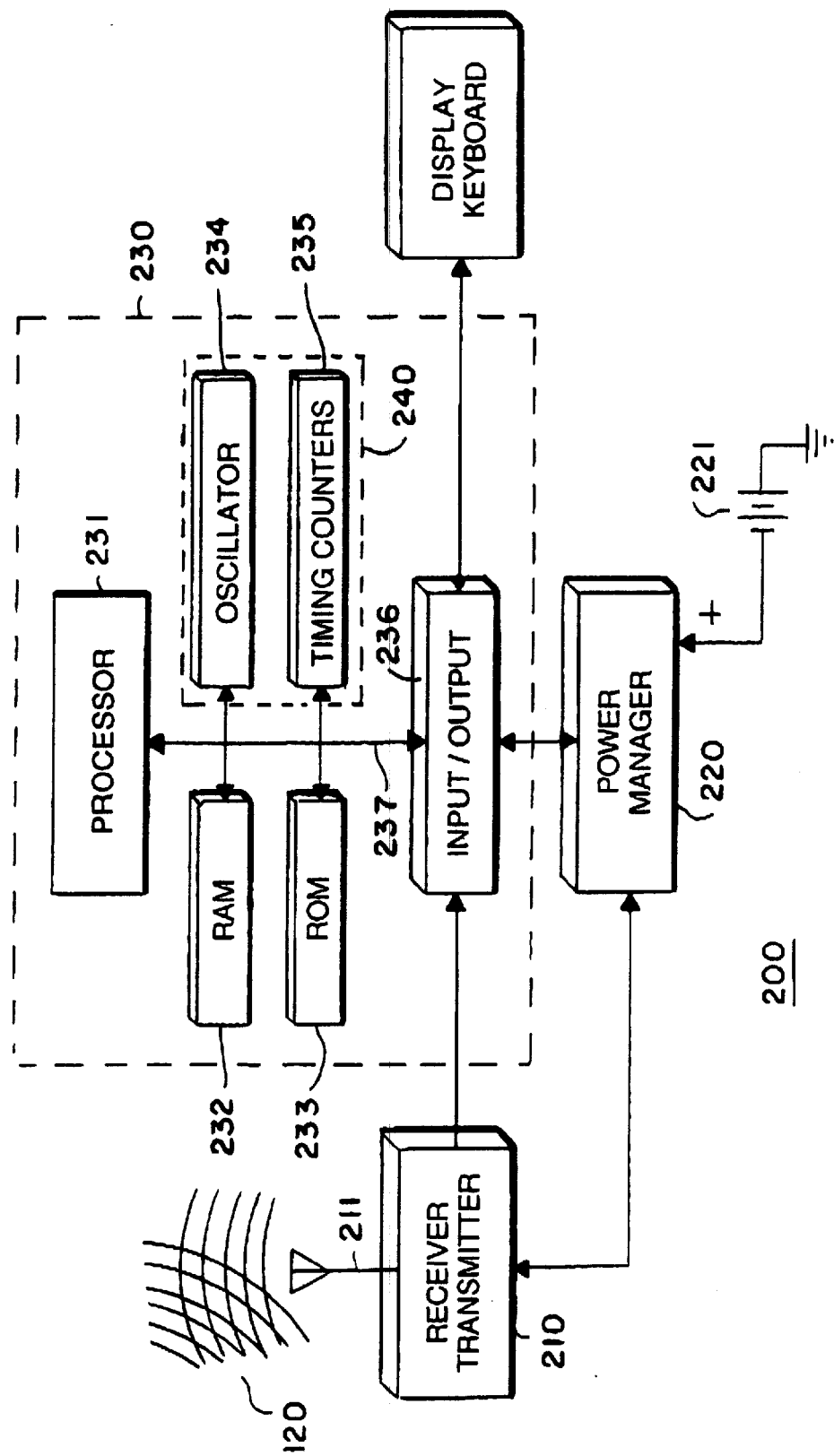
FIG. 2 is a block diagram of one of the devices according to the invention.

FIG. 2 shows the general structure of a node 200 of the network 100 of FIG. 1. It should be understood that an exact configuration of one of the nodes depends on its desired functionality, so a particular node may have fewer or more components than shown in FIG. 2.

The node 200 includes a transceiver section 210 coupled to an antenna 211. The transceiver section selects frequencies used for receiving and transmitting signals. It should be noted that the receiving section for the communication signals and the timing signals can be different.

A power manager 220 receives and distributes power from a limited capacity power source 221 to the rest of the components. The node 200 can also include some type of microprocessor-based system 230. The system 230 includes a processor 231, a random access memory (RAM) 232 and a read-only memory 233.

An oscillator 234 serves as a real-time clock with times maintained in timing counters 235. The oscillator, counters and other components for generating internal timing signals for the power manager 220 form a clock circuit 240.

The system 230 also includes an input/output interface 236. The components 231–236 of the system 230 are connected to each other by bus lines 237.

The input/output interface 236 couples the system 230 with the transceiver section 210 and the power manager 220. The interface 236 also can connect the system 230 to user accessible input/output components such as a keyboard, touch pad, display, or loudspeaker, depending on the desired functionality for the device 200.

Figure 3:
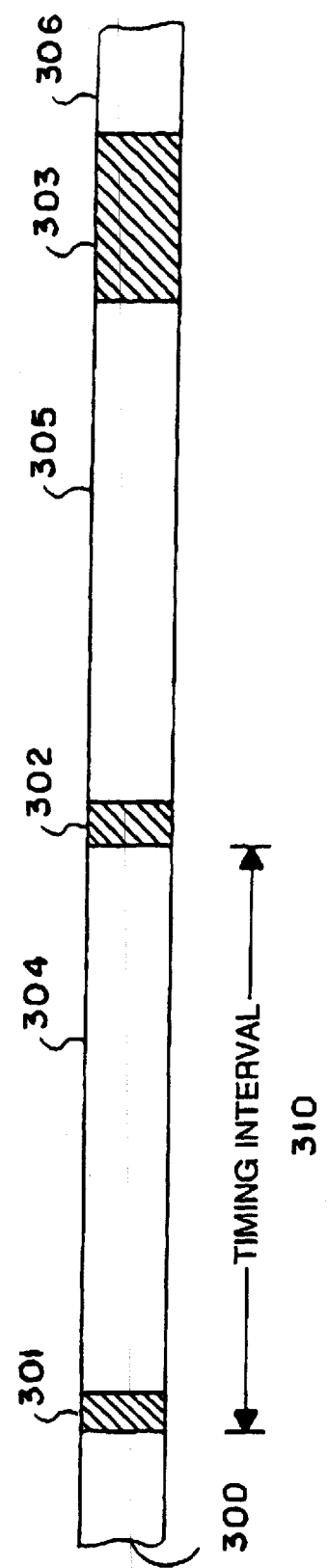
FIG. 3 is a timing diagram used by the devices of FIG. 2.

FIG. 3 shows a basic timing diagram 300 used to control the operation of the network 100. Transmitting and receiving of data is scheduled according to a protocol based on a basic timing interval 310. The length of the interval 310 can be an arbitrary amount of time, for example, five seconds. Shorter or longer intervals can be selected depending on the desired latency of the anticipated communications traffic on the network 100.

The shaded periods 301–303 indicate the length of time that the node 200 is in an "awake" mode and using an operational amount of power from the power source 221. The periods 304–306 indicate the length of time that the device 200 is in "sleep" mode and using a minimal amount of power.

During operation of the network 100, the nodes only interchange data when in awake mode. As can be seen, the amount of awake time is relatively small compared with the sleep time. The awake time can be extended, as for period 303, when additional data needs to be transferred, at the end of which the device reverts back to sleep mode.

Figure 4:
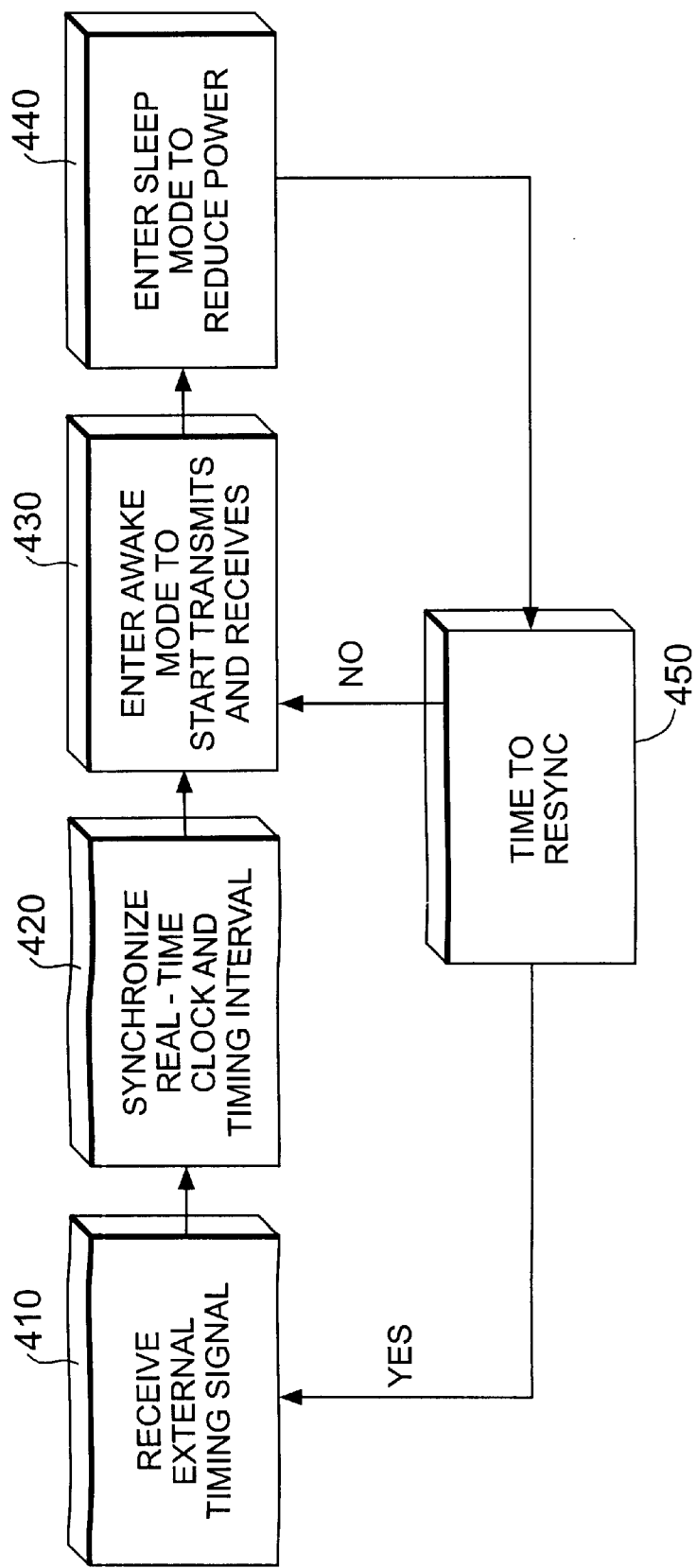
FIG. 4 is a flow diagram of a method used by the invention to reduce power consumption by the devices of the network of FIG. 1.

As shown in FIG. 4, the idea of the invention is that the timing of the awake and sleep periods 301–306 of the nodes 101–104 is periodically synchronized to the external timing source 110 in steps 410 and 420. In other words, no network resources are used to generate the timing signal 111 that synchronize the timing intervals 310 for the various nodes. Synchronization can be maintained, without centralized management by the network 100, as nodes enter and leave the network 100. Nodes initiate data transfers during the awake period in step 430, and significantly reduce power during the sleep period in step 440. The time to resync to the external source is determined in step 450. By using the external timing source 110 as the generator of the synchronization timing signal 111, consumption of power can be minimized.

An example will illustrate this power savings. Using known technology, a wireless transceiver (node) consumes about 30 mW of power to transmit and 10 mW of power to receive. A continuously running real-time clock of the node, with an accuracy of about 50 parts per million, consumes about 0.1 mW.

The following calculation can be done to determine the amount of power required to keep a clock running and synchronized to an external timing signal such as is transmitted by WWVB. The real-time clock drifts about 0.2 seconds per hour. If the scheduling protocol tolerates about 0.1 seconds of error, the real-time clock needs to be synchronized twice per hour.

WWVB receivers are available that take seventy seconds to receive a complete time broadcast, consuming 1.5 mW during the process. In normal operation, the real-time clock should not be off by more than a fraction of a second, so only the nearest one-second boundary in the timing signal 111 needs to be received. This takes only four seconds.

The calculation for the total amount of power consumed by the clock circuit 240 is based on, for example, receiving the WWVB timing signal for about twenty seconds per hour, on the average. This gives an amortized power of 1.5 mW times 20/3600, or about 0.0083 mW, so the entire power consumption by the real-time clock, including synchronization is about 0.1 mW. This shows that by using the external timing signal a very small amount of power is used.

In one embodiment of the invention, the present protocol uses a five second basic timing interval 310 to which all devices are synchronized. The normal awake period is 0.1 seconds long at the start of each basic interval 310. Each active device in the network broadcasts its identity to notify other devices of presence during a randomly selected 0.01 seconds portion of the awake period, and listen for the rest of the awake period. The identity can be used by the devices to determine how data are exchanged.

If clocks can drift by as much as 0.1 seconds, then a particular device may have to listen a full 0.3 seconds in order to hear the identity signal from another device. This means that during one five second interval, the transceiver consumes 30 mW for 0.01 seconds, 10 mW for 0.29 seconds. The clock circuit consumes 0.1 mW during the entire 5 seconds. This yields an average power consumption rate of 0.74 mW.

For scheduling protocols with even longer sleep periods, the present methodology can decrease power consumption, because the device consumes only about 0.1 mW during the sleep period.

The present invention significantly decreases the power consumed by a data network. While the primary application of the invention is for wireless radio data networks, the invention can also be used with infrared networks, wired networks, or other networks.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A method for reducing power consumption in a communications network including a plurality of portable devices, comprising the steps of:

periodically receiving a timing signal in each device from a transmitter external to the network, thereby providing for time synchronization of the plurality of devices without consuming therefor power in the network;

synchronizing a real-time clock in each device to the periodically received timing signal, the real-time clock determining a synchronized timing interval for providing an awake period and a sleep period for each device;

initiating transmitting and receiving of data between the devices during the awake period of the synchronized timing interval; and entering the sleep period of the synchronized timing interval upon completion of the awake period, the sleep period having a longer duration than the awake period.

2. The method of claim 1 including receiving the timing signal from a terrestrial broadcast signal.

3. The method of claim 1 including receiving the timing signal from a satellite broadcast signal.

4. The method of claim 1 including receiving the timing signal from a paging network.

5. The method of claim 1 including receiving the timing signal from an alternating current power grid.

6. The method of claim 1 by a continental standard timing signal broadcast.

7. The method of claim 1 wherein sleep period is longer by at least order of magnitude than the awake period.

8. The method of claim 1 wherein power consumption during the sleep period is at least two orders of magnitude less than during the awake period.

9. The method of claim 1 including extending the awake period to complete the transmitting and receiving of data.

10. The method of claim 1 including restricting power consumption to a clock circuit used by the real-time clock.

11. The method of claim 1 wherein each node transmits an identification during the awake period.

12. The method of claim 11, wherein the node identification is transmitted during a randomly selected interval of the awake period.

13. The method of claim 1 wherein the devices of the network communicate using electromagnetic waves.

14. The method of claim 1 wherein the devices of the network communicate using infrared signals.

15. The method of claim 1 wherein the timing signal is received for about twenty seconds of each hour.

16. An apparatus for reducing power consumption in a communications network including a plurality of portable devices, comprising:

means for periodically receiving a timing signal in each device from a transmitter external to the network, thereby providing for time synchronization of the plurality of devices without consuming therefor power in the network;

means for synchronizing a real-time clock in each device to the periodically received timing signal, the real-time clock determining a synchronized timing interval for providing an awake period and a sleep period for each device;

means for initiating transmitting and receiving of data between the devices during the awake period of the synchronized timing interval; and means for initiating the sleep period of the synchronized time interval after the awake period, the sleep period being significantly longer in duration than the awake period.

* * * * *